US012718778B2

(12) United States Patent
Paydavosi et al.

(10) Patent No.: US 12,718,778 B2
(45) Date of Patent: Aug. 25, 2026

(54) METHODS FOR DELIVERING LOW-GHOSTING PARTIAL UPDATES IN COLOR ELECTROPHORETIC DISPLAYS

(71) Applicant: E INK CORPORATION, Billerica, MA (US)

(72) Inventors: Sarah Paydavosi, Winchester, MA (US); Kenneth R. Crounse, Somerville, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 19/024,496

(22) Filed: Jan. 16, 2025

(65) Prior Publication Data

US 2025/0239231 A1 Jul. 24, 2025

Related U.S. Application Data

(60) Provisional application No. 63/623,229, filed on Jan. 20, 2024.

(51) Int. Cl.

*G09G 3/34* (2006.01)
*G02F 1/167* (2019.01)
*G09G 3/20* (2006.01)

(52) U.S. Cl.

CPC ............. *G09G 3/344* (2013.01); *G02F 1/167* (2013.01); *G09G 3/2044* (2013.01); *G09G 2320/0242* (2013.01); *G09G 2340/06* (2013.01)

(58) Field of Classification Search

CPC ............ G02F 1/167; G09G 2300/0452; G09G 2300/08; G09G 2310/04; G09G 2310/06; G09G 2320/0209; G09G 2320/0242; G09G 2320/0257; G09G 2340/06; G09G 2340/16; G09G 2380/14; G09G 3/2003; G09G 3/2044; G09G 3/344; G09G 5/06; G09G 3/2007; B01J 13/08; G06T 5/92; H04N 9/68

See application file for complete search history.

(56) References Cited

U.S. PATENT DOCUMENTS

| | | |
|---|---|---|
| 4,418,346 A | 11/1983 | Batchelder |
| 5,872,552 A | 2/1999 | Gordon, II et al. |
| 5,930,026 A | 7/1999 | Jacobson et al. |
| 6,017,584 A | 1/2000 | Albert et al. |
| 6,130,774 A | 10/2000 | Albert et al. |
| 6,144,361 A | 11/2000 | Gordon, II |
| 6,172,798 B1 | 1/2001 | Albert et al. |
| 6,184,856 B1 | 2/2001 | Gordon, II |
| 6,225,971 B1 | 5/2001 | Gordon, II |
| 6,241,921 B1 | 6/2001 | Jacobson et al. |
| 6,271,823 B1 | 8/2001 | Gordon, II |

(Continued)

OTHER PUBLICATIONS

European Patent Office, "International Search Report and Written Opinion", PCT/US2025/011835, Mar. 14, 2025.

*Primary Examiner* — Richard J Hong

(74) *Attorney, Agent, or Firm* — Rajesh Vallabh; Brian D. Bean

(57) ABSTRACT

Methods for improved partial updates in color electrophoretic displays. By identifying transition borders between pixels receiving null updates (no voltage sent to pixel electrode) and color updates, problematic pixels, which would have received null updates, are caused to update to a same color state, thereby reducing edge ghosting in the updated image and improving the color in the updated image.

11 Claims, 12 Drawing Sheets

(56) References Cited

U.S. PATENT DOCUMENTS 6,445,489 B1 9/2002 Jacobson et al.
6,504,524 B1 1/2003 Gates et al.
6,512,354 B2 1/2003 Jacobson et al.
6,531,997 B1 3/2003 Gates et al.
6,545,797 B2 4/2003 Chen et al.
6,664,944 B1 12/2003 Albert et al.
6,672,921 B1 1/2004 Liang et al.
6,753,999 B2 6/2004 Zehner et al.
6,788,449 B2 9/2004 Liang et al.
6,788,452 B2 9/2004 Liang et al.
6,825,970 B2 11/2004 Goenaga et al.
6,864,875 B2 3/2005 Drzaic et al.
6,866,760 B2 3/2005 Paolini, Jr. et al.
6,900,851 B2 5/2005 Morrison et al.
6,914,714 B2 7/2005 Chen et al.
6,922,276 B2 7/2005 Zhang et al.
6,972,893 B2 12/2005 Chen et al.
6,982,178 B2 1/2006 LeCain et al.
6,995,550 B2 2/2006 Jacobson et al.
7,002,728 B2 2/2006 Pullen et al.
7,012,600 B2 3/2006 Zehner et al.
7,023,420 B2 4/2006 Comiskey et al.
7,034,783 B2 4/2006 Gates et al.
7,038,656 B2 5/2006 Liang et al.
7,038,670 B2 5/2006 Liang et al.
7,046,228 B2 5/2006 Liang et al.
7,052,571 B2 5/2006 Wang et al.
7,061,166 B2 6/2006 Kuniyasu
7,061,662 B2 6/2006 Chung et al.
7,072,095 B2 7/2006 Liang et al.
7,075,502 B1 7/2006 Drzaic et al.
7,116,318 B2 10/2006 Amundson et al.
7,116,466 B2 10/2006 Whitesides et al.
7,119,772 B2 10/2006 Amundson et al.
7,144,942 B2 12/2006 Zang et al.
7,167,155 B1 1/2007 Albert et al.
7,170,670 B2 1/2007 Webber
7,176,880 B2 2/2007 Amundson et al.
7,177,066 B2 2/2007 Chung et al.
7,193,625 B2 3/2007 Danner et al.
7,202,847 B2 4/2007 Gates
7,242,514 B2 7/2007 Chung et al.
7,259,744 B2 8/2007 Arango et al.
7,304,787 B2 12/2007 Whitesides et al.
7,312,784 B2 12/2007 Baucom et al.
7,312,794 B2 12/2007 Zehner et al.
7,327,511 B2 2/2008 Whitesides et al.
7,339,715 B2 3/2008 Webber et al.
7,385,751 B2 6/2008 Chen et al.
7,408,699 B2 8/2008 Wang et al.
7,411,719 B2 8/2008 Paolini, Jr. et al.
7,453,445 B2 11/2008 Amundson
7,492,339 B2 2/2009 Amundson
7,492,505 B2 2/2009 Liang et al.
7,528,822 B2 5/2009 Amundson et al.
7,535,624 B2 5/2009 Amundson et al.
7,545,358 B2 6/2009 Gates et al.
7,583,251 B2 9/2009 Arango et al.
7,602,374 B2 10/2009 Zehner et al.
7,612,760 B2 11/2009 Kawai
7,667,684 B2 2/2010 Jacobson et al.
7,679,599 B2 3/2010 Kawai
7,679,813 B2 3/2010 Liang et al.
7,679,814 B2 3/2010 Paolini, Jr. et al.
7,683,606 B2 3/2010 Kang et al.
7,684,108 B2 3/2010 Wang et al.
7,688,297 B2 3/2010 Zehner et al.
7,715,088 B2 5/2010 Liang et al.
7,729,039 B2 6/2010 LeCain et al.
7,733,311 B2 6/2010 Amundson et al.
7,733,335 B2 6/2010 Zehner et al.
7,787,169 B2 8/2010 Abramson et al.
7,791,789 B2 9/2010 Albert et al.
7,800,813 B2 9/2010 Wu et al.
7,821,702 B2 10/2010 Liang et al.
7,839,564 B2 11/2010 Whitesides et al.
7,859,742 B1 12/2010 Chiu et al.
7,910,175 B2 3/2011 Webber
7,952,557 B2 5/2011 Amundson
7,952,790 B2 5/2011 Honeyman et al.
7,956,841 B2 6/2011 Albert et al.
7,982,479 B2 7/2011 Wang et al.
7,982,941 B2 7/2011 Lin et al.
7,999,787 B2 8/2011 Amundson et al.
8,009,348 B2 8/2011 Zehner et al.
8,040,594 B2 10/2011 Paolini, Jr. et al.
8,054,526 B2 11/2011 Bouchard
8,077,141 B2 12/2011 Duthaler et al.
8,098,418 B2 1/2012 Paolini, Jr. et al.
8,125,501 B2 2/2012 Amundson et al.
8,139,050 B2 3/2012 Jacobson et al.
8,159,636 B2 4/2012 Sun et al.
8,174,490 B2 5/2012 Whitesides et al.
8,213,076 B2 7/2012 Albert et al.
8,243,013 B1 8/2012 Sprague et al.
8,274,472 B1 9/2012 Wang et al.
8,289,250 B2 10/2012 Zehner et al.
8,300,006 B2 10/2012 Zhou et al.
8,305,341 B2 11/2012 Arango et al.
8,314,784 B2 11/2012 Ohkami et al.
8,363,299 B2 1/2013 Paolini, Jr. et al.
8,373,649 B2 2/2013 Low et al.
8,384,658 B2 2/2013 Albert et al.
8,422,116 B2 4/2013 Sprague et al.
8,441,714 B2 5/2013 Paolini, Jr. et al.
8,441,716 B2 5/2013 Paolini, Jr. et al.
8,456,414 B2 6/2013 Lin et al.
8,462,102 B2 6/2013 Wong et al.
8,466,852 B2 6/2013 Drzaic et al.
8,503,063 B2 8/2013 Sprague
8,514,168 B2 8/2013 Chung et al.
8,537,105 B2 9/2013 Chiu et al.
8,558,783 B2 10/2013 Wilcox et al.
8,558,785 B2 10/2013 Zehner et al.
8,558,786 B2 10/2013 Lin
8,558,855 B2 10/2013 Sprague et al.
8,576,164 B2 11/2013 Sprague et al.
8,576,259 B2 11/2013 Lin et al.
8,576,470 B2 11/2013 Paolini, Jr. et al.
8,576,475 B2 11/2013 Huang et al.
8,593,396 B2 11/2013 Amundson et al.
8,593,721 B2 11/2013 Albert et al.
8,605,032 B2 12/2013 Liu et al.
8,605,354 B2 12/2013 Zhang et al.
8,643,595 B2 2/2014 Chung et al.
8,649,084 B2 2/2014 Wang et al.
8,665,206 B2 3/2014 Lin et al.
8,670,174 B2 3/2014 Sprague et al.
8,681,191 B2 3/2014 Yang et al.
8,704,756 B2 4/2014 Lin
8,717,664 B2 5/2014 Wang et al.
8,730,153 B2 5/2014 Sprague et al.
8,786,935 B2 7/2014 Sprague
8,797,634 B2 8/2014 Paolini, Jr. et al.
8,810,525 B2 8/2014 Sprague
8,810,899 B2 8/2014 Sprague et al.
8,830,559 B2 9/2014 Honeyman et al.
8,873,129 B2 10/2014 Paolini, Jr. et al.
8,878,770 B2 11/2014 Miyazaki et al.
8,902,153 B2 12/2014 Bouchard et al.
8,902,491 B2 12/2014 Wang et al.
8,917,439 B2 12/2014 Wang et al.
8,928,562 B2 1/2015 Gates et al.
8,928,641 B2 1/2015 Chiu et al.
8,964,282 B2 2/2015 Wang et al.
8,976,444 B2 3/2015 Zhang et al.
9,013,394 B2 4/2015 Lin
9,013,783 B2 4/2015 Sprague
9,019,197 B2 4/2015 Lin
9,019,198 B2 4/2015 Lin et al.
9,019,318 B2 4/2015 Sprague et al.
9,082,352 B2 7/2015 Cheng et al.
9,116,412 B2 8/2015 Lin
9,146,439 B2 9/2015 Zhang

(56) References Cited

U.S. PATENT DOCUMENTS 9,164,207 B2 10/2015 Honeyman et al.
9,170,467 B2 10/2015 Whitesides et al.
9,170,468 B2 10/2015 Lin et al.
9,171,508 B2 10/2015 Sprague et al.
9,182,646 B2 11/2015 Paolini, Jr. et al.
9,195,111 B2 11/2015 Anseth et al.
9,199,441 B2 12/2015 Danner
9,218,773 B2 12/2015 Sun et al.
9,224,338 B2 12/2015 Chan et al.
9,224,342 B2 12/2015 Lin et al.
9,224,344 B2 12/2015 Chung et al.
9,230,492 B2 1/2016 Harrington et al.
9,251,736 B2 2/2016 Lin et al.
9,262,973 B2 2/2016 Wu et al.
9,268,191 B2 2/2016 Paolini, Jr. et al.
9,269,311 B2 2/2016 Amundson
9,279,906 B2 3/2016 Kang
9,285,649 B2 3/2016 Du et al.
9,293,511 B2 3/2016 Jacobson et al.
9,299,294 B2 3/2016 Lin et al.
9,341,916 B2 5/2016 Telfer et al.
9,360,733 B2 6/2016 Wang et al.
9,361,836 B1 6/2016 Telfer et al.
9,373,289 B2 6/2016 Sprague et al.
9,383,623 B2 7/2016 Lin et al.
9,390,066 B2 7/2016 Smith
9,390,661 B2 7/2016 Chiu et al.
9,412,314 B2 8/2016 Amundson et al.
9,423,666 B2 8/2016 Wang et al.
9,459,510 B2 10/2016 Lin
9,460,666 B2 10/2016 Sprague et al.
9,495,918 B2 11/2016 Harrington et al.
9,501,981 B2 11/2016 Lin et al.
9,513,527 B2 12/2016 Chan et al.
9,513,743 B2 12/2016 Sjodin et al.
9,514,667 B2 12/2016 Lin
9,541,814 B2 1/2017 Lin et al.
9,542,895 B2 1/2017 Gates et al.
9,564,088 B2 2/2017 Wilcox et al.
9,612,502 B2 4/2017 Danner et al.
9,620,048 B2 4/2017 Sim et al.
9,620,067 B2 4/2017 Harrington et al.
9,671,668 B2 6/2017 Chan et al.
9,672,766 B2 6/2017 Sjodin
9,691,333 B2 6/2017 Cheng et al.
9,697,778 B2 7/2017 Telfer et al.
9,721,495 B2 8/2017 Harrington et al.
9,740,076 B2 8/2017 Paolini et al.
9,759,980 B2 9/2017 Du et al.
9,792,861 B2 10/2017 Chang et al.
9,792,862 B2 10/2017 Hung et al.
9,812,073 B2 11/2017 Lin et al.
9,835,925 B1 12/2017 Bull et al.
9,921,451 B2 3/2018 Telfer et al.
9,922,603 B2 3/2018 Lin
9,966,018 B2 5/2018 Gates et al.
10,032,419 B2 7/2018 Lin et al.
10,062,337 B2 8/2018 Lin et al.
10,162,242 B2 12/2018 Wang et al.
10,163,406 B2 12/2018 Sim et al.
10,209,556 B2 2/2019 Rosenfeld et al.
10,229,641 B2 3/2019 Yang et al.
10,276,109 B2 4/2019 Crounse et al.
10,319,313 B2 6/2019 Harris et al.
10,339,876 B2 7/2019 Lin et al.
10,353,266 B2 7/2019 Bouchard et al.
10,444,553 B2 10/2019 Laxton
10,444,592 B2 10/2019 Bouchard
10,467,984 B2 11/2019 Buckley et al.
10,514,583 B2 12/2019 Zhang
10,593,272 B2 3/2020 Telfer et al.
10,672,350 B2 6/2020 Amundson et al.
11,030,936 B2 6/2021 Emelie et al.
11,049,463 B2 6/2021 Lin et al.
11,170,688 B2 11/2021 Kim et al.
11,557,260 B2 1/2023 Crounse et al.
11,568,786 B2 1/2023 Crounse
11,620,959 B2 4/2023 Deliwala
11,640,803 B2 5/2023 Lin et al.
11,776,496 B2 10/2023 Telfer et al.
11,869,451 B2 1/2024 Crounse
12,131,713 B2 10/2024 Deliwala et al.
2003/0102858 A1 6/2003 Jacobson et al.
2004/0246562 A1 12/2004 Chung et al.
2005/0253777 A1 11/2005 Zehner et al.
2007/0091418 A1 4/2007 Danner et al.
2007/0103427 A1 5/2007 Zhou et al.
2007/0176912 A1 8/2007 Beames et al.
2008/0024429 A1 1/2008 Zehner
2008/0024482 A1 1/2008 Gates et al.
2008/0043318 A1 2/2008 Whitesides et al.
2008/0048970 A1 2/2008 Drzaic et al.
2008/0136774 A1 6/2008 Harris et al.
2008/0303780 A1 12/2008 Sprague et al.
2009/0058873 A1* 3/2009 Brown Elliott ........... G06T 5/92 345/589
2009/0174651 A1 7/2009 Jacobson et al.
2009/0225398 A1 9/2009 Duthaler et al.
2009/0322721 A1 12/2009 Zehner et al.
2010/0156780 A1 6/2010 Jacobson et al.
2010/0194733 A1 8/2010 Lin et al.
2010/0194789 A1 8/2010 Lin et al.
2010/0220121 A1 9/2010 Zehner et al.
2010/0265561 A1 10/2010 Gates et al.
2011/0001764 A1* 1/2011 Rhodes .................. G09G 3/344 345/690
2011/0043543 A1 2/2011 Chen et al.
2011/0063314 A1 3/2011 Chiu et al.
2011/0193840 A1 8/2011 Amundson et al.
2011/0193841 A1 8/2011 Amundson et al.
2011/0199671 A1 8/2011 Amundson et al.
2011/0221740 A1 9/2011 Yang et al.
2011/0285713 A1* 11/2011 Swic ........................ H04N 9/68 345/428
2012/0001957 A1 1/2012 Liu et al.
2012/0044276 A1* 2/2012 Yamada ................. G09G 3/344 345/212
2012/0098740 A1 4/2012 Chiu et al.
2012/0287174 A1* 11/2012 Miyazaki ............... G09G 3/344 345/690
2012/0326957 A1 12/2012 Drzaic et al.
2013/0063333 A1 3/2013 Arango et al.
2013/0242378 A1 9/2013 Paolini, Jr. et al.
2013/0249782 A1 9/2013 Wu et al.
2013/0278995 A1 10/2013 Drzaic et al.
2014/0009817 A1 1/2014 Wilcox et al.
2014/0055840 A1 2/2014 Zang et al.
2014/0078576 A1 3/2014 Sprague
2014/0204012 A1 7/2014 Wu et al.
2014/0240210 A1 8/2014 Wu et al.
2014/0253425 A1 9/2014 Zalesky et al.
2014/0293398 A1 10/2014 Wang et al.
2014/0362213 A1 12/2014 Tseng
2015/0005720 A1 1/2015 Zang
2015/0118390 A1 4/2015 Rosenfeld et al.
2015/0262255 A1 9/2015 Khajehnouri
2015/0262551 A1 9/2015 Zehner et al.
2015/0268531 A1 9/2015 Wang et al.
2015/0301246 A1 10/2015 Zang et al.
2016/0012710 A1 1/2016 Lu et al.
2016/0048054 A1 2/2016 Danner
2016/0140910 A1 5/2016 Amundson
2016/0180777 A1 6/2016 Lin et al.
2017/0148372 A1* 5/2017 Emelie ................... G09G 3/344
2021/0132459 A1 5/2021 Bull
2021/0191226 A1* 6/2021 Telfer ....................... B01J 13/08
2021/0375183 A1* 12/2021 Crounse ............... G09G 3/2007

* cited by examiner

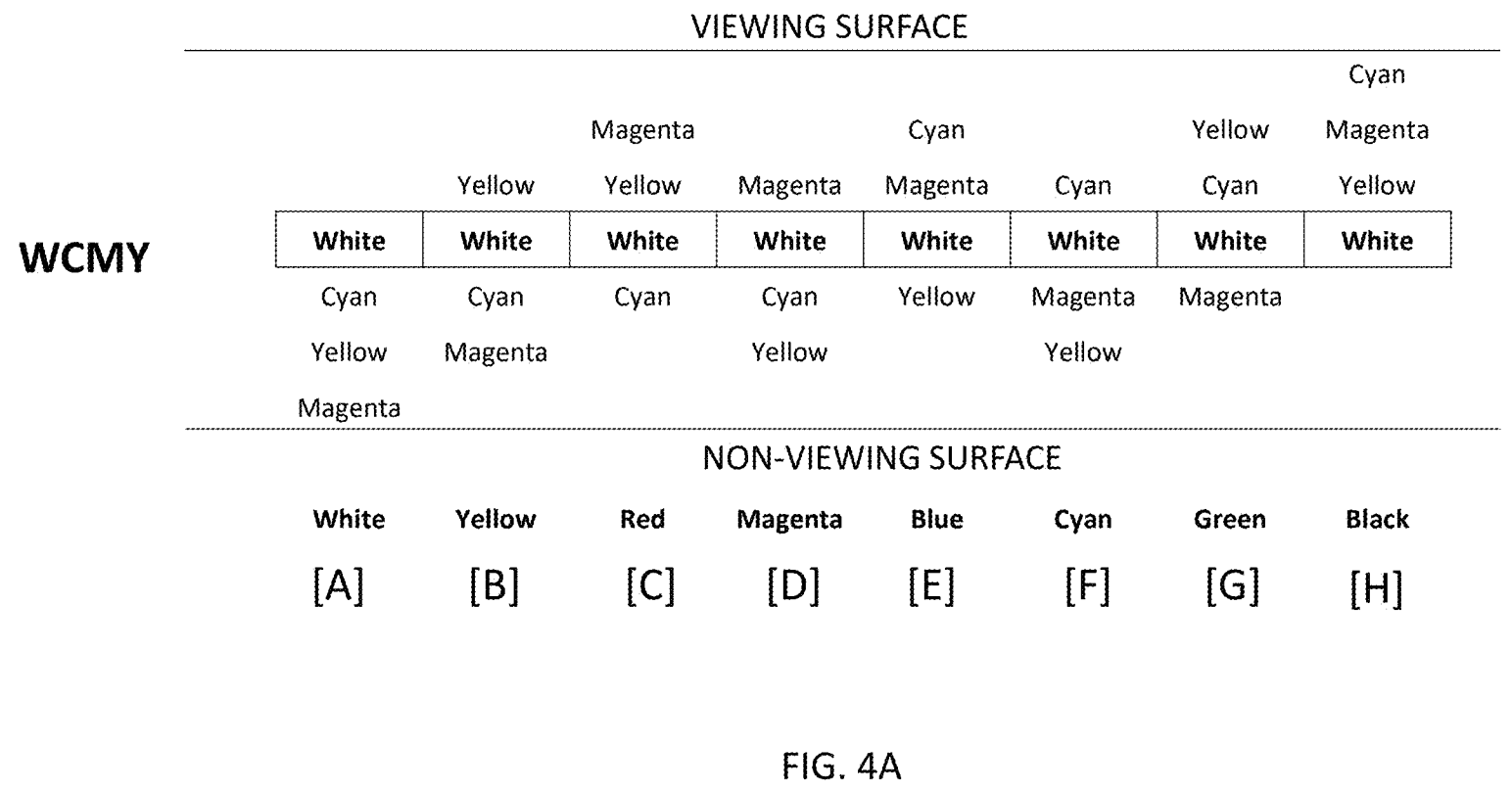

WCMY

VIEWING SURFACE

| | | | | | | | |
|---|---|---|---|---|---|---|---|
| | | | | | | | Cyan |
| | | Magenta | | Cyan | | Yellow | Magenta |
| | Yellow | Yellow | Magenta | Magenta | Cyan | Cyan | Yellow |
| **White** | **White** | **White** | **White** | **White** | **White** | **White** | **White** |
| Cyan | Cyan | Cyan | Cyan | Yellow | Magenta | Magenta | |
| Yellow | Magenta | | Yellow | | Yellow | | |
| Magenta | | | | | | | |

NON-VIEWING SURFACE

| | | | | | | | |
|---|---|---|---|---|---|---|---|
| **White** | **Yellow** | **Red** | **Magenta** | **Blue** | **Cyan** | **Green** | **Black** |
| [A] | [B] | [C] | [D] | [E] | [F] | [G] | [H] |

FIG. 4A

Figure 4B:
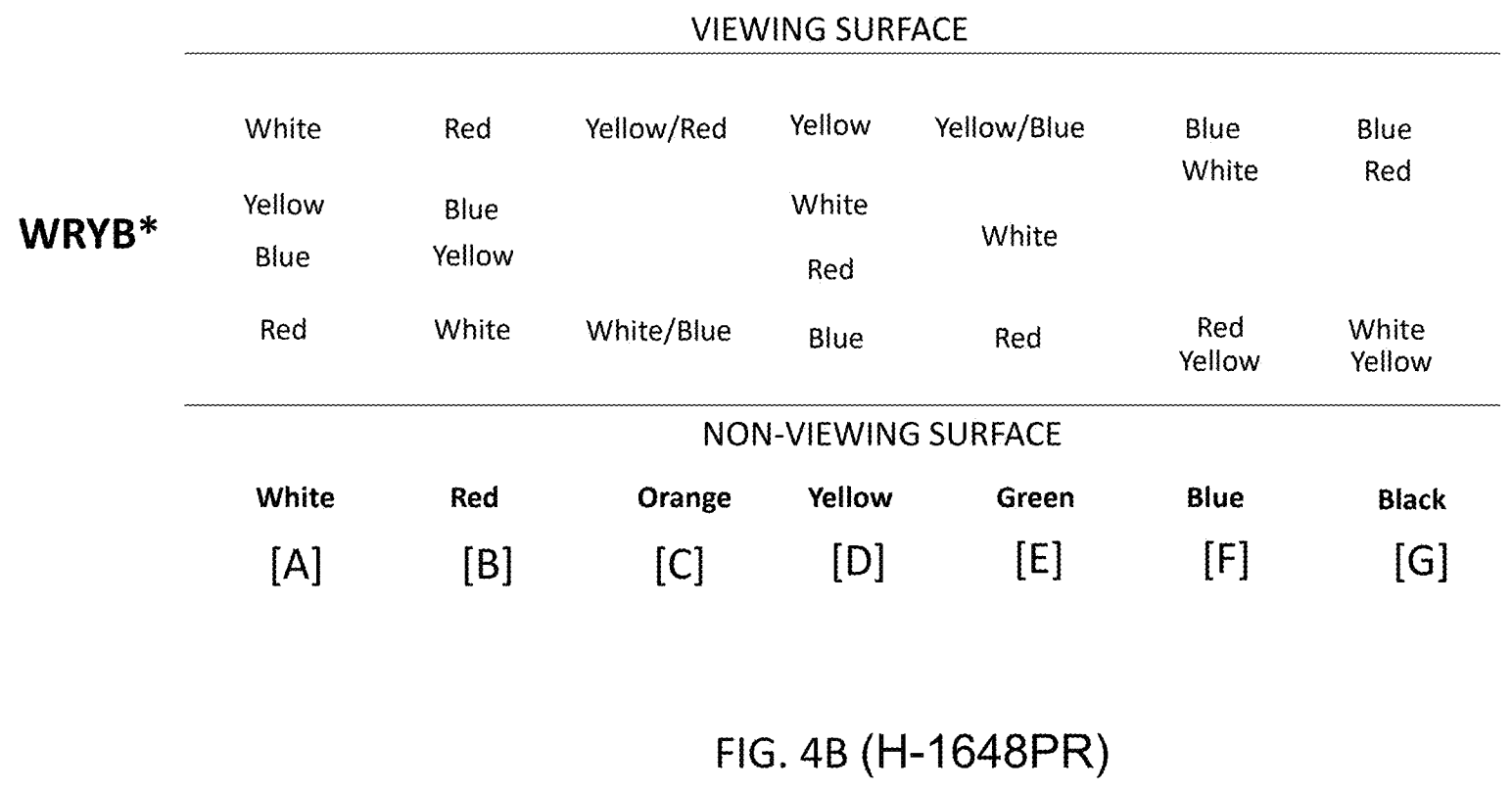

WRYB*

VIEWING SURFACE

White
Yellow
Blue
Red

Red
Blue
Yellow
White

Yellow/Red
White/Blue

Yellow
White
Red
Blue

Yellow/Blue
White
Red

Blue
White
Red
Yellow

Blue
Red
White
Yellow

NON-VIEWING SURFACE

| **White** | **Red** | **Orange** | **Yellow** | **Green** | **Blue** | **Black** |
|---|---|---|---|---|---|---|
| [A] | [B] | [C] | [D] | [E] | [F] | [G] |

FIG. 4B (H-1648PR)

METHODS FOR DELIVERING LOW-GHOSTING PARTIAL UPDATES IN COLOR ELECTROPHORETIC DISPLAYS

RELATED APPLICATIONS

This application claims priority to U.S. Provisional Application No. 63/623,229, filed Jan. 20, 2024. All patents and publications disclosed herein are incorporated by reference in their entireties.

BACKGROUND

An electrophoretic display (EPD) changes color by modifying the position of a charged colored particle with respect to a light-transmissive viewing surface. Such electrophoretic displays are typically referred to as "electronic paper" or "ePaper" because the resulting display has high contrast and is sunlight-readable, much like ink on paper. In the simplest sense, an electrophoretic display only requires a light-transmissive electrode at the viewing surface, a back electrode, and an electrophoretic medium including one or more types of charged colored particles. If the back electrode includes controllable regions (pixels)—either segmented electrodes or an active matrix of pixel electrodes controlled by transistors—a pattern can be made to appear electronically at the viewing surface. The pattern can be, for example, the text to a book.

A variety of color option have become commercially available for electrophoretic displays, including four-color displays (black, white, red, yellow; red, white, yellow, semi-transparent blue; cyan, yellow, magenta, white). Electrophoretic displays with four types of electrophoretic particles operate similar to the simple black and white displays EPDs when, for example, a single color matching the color of one of the particles is desired at the viewing surface. However, obtaining a broader color gamut, including mixed colors and process colors is more complicated and requires more exquisite control of the relative positions of the particles with respect to each other and the viewing surface. When done correctly, such four particle systems allow hundreds of different colors to be produced at each pixel. More details of such systems are available in the following U.S. Patents, all of which are incorporated by reference in their entireties: U.S. Pat. Nos. 9,361,836, 9,921,451, 10,276,109, 10,353,266, 10,467,984, and 10,593,272.

Color electrophoretic displays can also be achieved using color filters arrays (CFA) disposed above or below a layer of electrophoretic display materials, for example a layer of microcapsules with black and white oppositely-charged particles that change position relative to a viewer due to a provided electric field. See, e.g., U.S. Pat. Nos. 8,098,418 and 10,444,592. However, electrophoretic displays incorporating CFAs suffer from loss of color spatial resolution due to subpixels. Sec, e.g., FIGS. 1D and 1E of the instant application, illustrating that a "pixel" (dashed bounding box) of a CFA-enabled display typically comprises at least three individually-controllable subpixels. Traditionally, CFA displays have red, green, and blue filters, however other complimentary sets of colors can be used. Because of the subpixels, if one of the primary colors is to be shown for a pixel of the display, the pixel has only one third or less (less because there is filling between subpixels) of the display area to be utilized for showing that color. The other subpixels are dark to increase the chromaticity of the desired color.

Of course, most color images require more than red, green, blue, black, and white pixels. While it is possible to approximate some colors (e.g., purple) with mixes of subpixels, a more common method is to dither the colors across the pixels in an image to achieve the desired color and shading. However, when dithering is used to increase the available colors in an electrophoretic display, the dithered subpixels involved in the dithering process may be subject to unwanted cross-talk with nearby subpixels, which can result in dithered colors looking "off". See, e.g., U.S. Pat. No. 11,869,451. Additional problems arise when, e.g., only part of the image is updated (a.k.a. partial update), which can also result in colors on the non-updated edges on the border of the updated pixels looking "off." See, e.g., U.S. Pat. No. 11,557,260.

For the most part, electrophoretic media, such as described above, are designed to be driven with low voltage square waves, such as produced by a driver circuit from a thin-film-transistor backplane. Such driver circuits can be inexpensively mass-produced because they are very closely related to the driving circuitry and fabrication methods that are used to produce liquid crystal display panels, such as found in smart phones, laptop monitors, and televisions. Historically, even when electrophoretic media are driven directly via an isolated electrode (e.g., segmented electrode) the driving pulses are delivered as square waves, having an amplitude and a time width. See, for example, U.S. Pat. No. 7,012,600, incorporated by reference in its entirety. Typically, for an active matrix backplane including an array of pixel electrodes, each pixel electrode will receive a signal pulse (square wave) for a short period of time as the array of pixel electrodes are addressed in a line-by-line fashion. The period of time that it takes to update the entire array of pixels, and also the time between updates of an individual pixel electrode is known as a frame. The collection of voltage impulses required to change the display from a first display state to a second state is generally known as a waveform. A waveform typically includes at least three frames, e.g., as described in U.S. Pat. No. 11,620,959, which is incorporated by reference in its entirety.

When the electrophoretic medium includes multiple types of particles with the same charge polarity but different charge magnitudes, the final position of a given set of particles (and the optical state) is typically controlled with a sequence of positive and negative voltage impulses. For example, all of the positive particles may be driven to the viewing surface and then a combination of negative and positive voltages serves to disaggregate the collection of positive particles and drive the unwanted positive particles away from the view surface so that only the desired particle sets are viewed. However, driving methods that require multiple positive and negative pulses often result in color transitions that are visibly jarring to a user, also known as "flashy updates." It is possible to decrease the amount of flash by making the waveforms longer and using smaller voltage steps, however such waveforms are not suitable for applications such as page turning or stylus writing. In such applications, a user expects a nearly instantaneous response by the display and high contrast between first and second optical states. (See, e.g., U.S. Patent Publication No. 2022/0262323 for a description of long gradual waveforms.) Historically, it has been difficult to achieve a short, low flash, low latency color waveform for such multi-particle systems.

Electro-optic displays typically have a backplane provided with a plurality of pixel electrodes each of which defines one pixel of the display. Each pixel electrode is typically disposed in a rectangular array of pixel electrodes and each pixel electrode is controlled with a thin-film transistor (TFT), and the TFTs are updated in a row-by-row fashion. Conventionally, a single common electrode extending over a large number of pixels, and normally the whole display is provided on the opposed side of the electro-optic medium. The individual pixel electrodes may be driven directly (i.e., a separate conductor may be provided to each pixel electrode) or the pixel electrodes may be driven in an active matrix manner which will be familiar to those skilled in backplane technology. Since adjacent pixel electrodes will often be at different voltages, they must be separated by inter-pixel gaps of finite width in order to avoid electrical shorting between electrodes. Although at first glance it might appear that the electro-optic medium overlying these gaps would not switch when drive voltages are applied to the pixel electrodes (and indeed, this is often the case with some non-bistable electro-optic media, such as liquid crystals, where a black mask is typically provided to hide these non-switching gaps), in the case of many bistable electro-optic media the medium overlying the gap does switch because of a phenomenon known as "blooming".

Blooming refers to the tendency for application of a drive voltage to a pixel electrode to cause a change in the optical state of the electro-optic medium over an area larger than the physical size of the pixel electrode. An area of blooming is not a uniform color, but is typically a transition zone where, as one moves across the area of blooming, the color of the medium transitions from the desired color to another shade or color, for example a desired white pixel may include various shades of gray along the edges, a.k.a., "edge ghosting". Furthermore depending upon the type of display, i.e., black/white, color, black/white with color filter, the results of the edge ghosting can range from annoying to debilitating. In some cases, asymmetric blooming may contribute to edge ghosting.

Much of the discussion below will focus on methods for driving one or more pixel electrodes of an electro-optic display through a transition from a first optical (i.e., color) state to a final optical state (which may or may not be different from the initial optical state). The term "waveform" will be used to denote the entire voltage against time curve used to effect the transition from one specific first color state to a specific second color state. Typically such a waveform will comprise a plurality of waveform elements; where these elements are essentially rectangular (V×t) voltage pulses (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays. While the bistable nature of electrophoretic displays allows for massive power savings over traditional "always on" displays such as LCD and LED, the bistability can lead to image retention between updates, a.k.a. "ghosts".

The term impulse, when used to refer to driving an electrophoretic display, is used herein to refer to the integral of the applied voltage with respect to time during the period in which the display is driven. The term waveform, when used to refer to driving an electrophoretic display is used to describe a series or pattern of voltages provided to an electrophoretic medium over a given time period (seconds, frames, etc.) to produce a desired optical effect in the electrophoretic medium.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594;

8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462, 102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777;

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively. Additionally, as described in US Patent Application Publication No. 2021/0132459, encapsulated electrophoretic media can be incorporated into non-planar surfaces that are, in turn, incorporated into everyday objects.

As a result, surfaces of products, building materials, etc. can be engineered to change color when a suitable electric field is supplied.

SUMMARY

Disclosed herein are methods for improved partial updates in color electrophoretic displays. Color electrophoretic displays present more colors than black and white and grayscale to a user, i.e., showing at least red, yellow, black, and white. In a first aspect, a method for updating a color electrophoretic display having a controller and a plurality of display pixels in an array. The method includes: determining for each display pixel in the plurality of display pixels whether that display pixel has identical color data for a first image and a second image; sending instructions to the controller to provide waveforms corresponding to the color data of the second image for each display pixel having different color data between the first image and the second image; determining whether color data changes between the first image and the second image for each of four cardinal closest display pixels for each display pixel determined to have identical color data for the first image and the second image; sending instructions to the controller to provide waveforms corresponding to the color data of the second image for each display pixel having identical color data between the first image and the second image and having at least one of its four cardinal closest display pixels having different color data between the first image and the second image; sending instructions to the controller to provide no waveforms to each display pixel having identical color data between the first image and the second image and having its four cardinal closest display pixels also having identical color data between the first image and the second image. In some embodiments, the electrophoretic display comprises an electrophoretic medium including electrically charged particles dispersed in a fluid and confined within a plurality of capsules or microcells. In some embodiments, the electrophoretic medium includes four different types of electrically charged particles, and at least two of the types of electrically charged particles have opposite polarities. In some embodiments, six primary colors can be formed at each pixel electrode of the electrophoretic display. In some embodiments, the electrophoretic display includes a color filter array. In some embodiments, the color filter array comprises a plurality of differently colored filters and individual differently colored filters are indexed to pixel electrodes of the electrophoretic display. In some embodiments, each display pixel in the plurality of display pixels corresponds to a plurality of differently colored filters indexed to a respective plurality of pixel electrodes. In some embodiments, the color data is RGB color data. In some embodiments, the color data has been transformed from RGB to color data specific to the electrophoretic display. In some embodiments, the color data represents a color image that incorporated dithering.

In another aspect, a method for updating a color electrophoretic display having a controller and a plurality of display pixels. The method includes: comparing color data for the plurality of display pixels for a first image to color data for the plurality of display pixels in a second image; determining an m×n array of display pixels for which all of the display pixels have the same color data for both the first image and the second image; determining an i×j array of display pixels for which some of the display pixels have different color data between the first image and the second image, wherein a combination of the m×n array of display pixels and the i×j array of display pixels accounts for all of the display pixels in the plurality of display pixels; sending instructions to the controller to provide no update to a pixel area slightly smaller than the m×n array of display pixels when transitioning from the first image to the second image; and sending instructions to the controller to provide waveforms corresponding to the color data of the second image to all of the remaining display pixels that did not receive no update instructions, wherein some of the pixels receiving waveforms corresponding to the color data for the second image are within the m×n array of display pixels. In some embodiments, the no update pixel area is at least two pixel row heights smaller than the m×n array of display pixels or at least two pixel column widths smaller than the m×n array of display pixels. In some embodiments, the electrophoretic display comprises an electrophoretic medium including electrically charged particles dispersed in a fluid and confined within a plurality of capsules or microcells. In some embodiments, the electrophoretic medium includes four different types of electrically charged particles, and at least two of the types of electrically charged particles have opposite polarities. In some embodiments, six primary colors can be formed at each pixel electrode of the electrophoretic display. In some embodiments, the electrophoretic display includes a color filter array. In some embodiments, the color filter array comprises a plurality of differently colored filters and individual differently colored filters are indexed to pixel electrodes of the electrophoretic display. In some embodiments, each display pixel in the plurality of display pixels corresponds to a plurality of differently colored filters indexed to a respective plurality of pixel electrodes. In some embodiments, the color data is RGB color data. In some embodiments, the color data has been transformed from RGB to color data specific to the electrophoretic display. In some embodiments, the color data represents a color image that incorporated dithering.

Figure 1A:
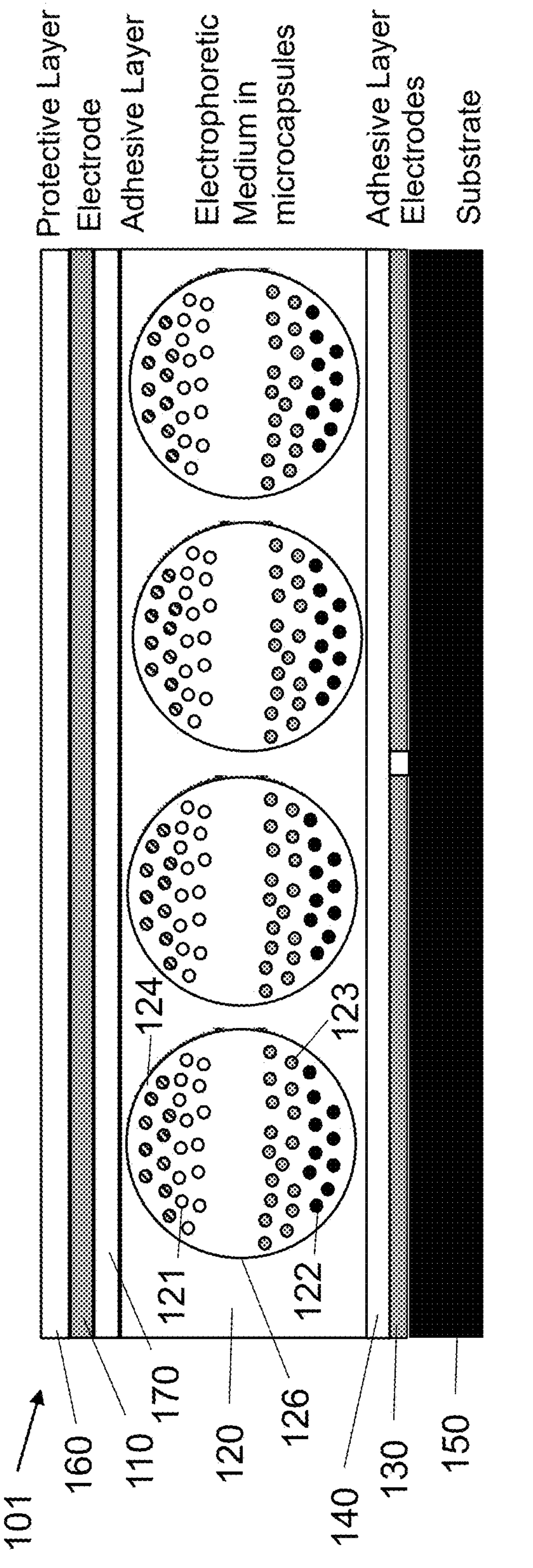
FIG. 1A is a representative cross-section of a four-particle electrophoretic display wherein the electrophoretic medium is encapsulated in microcapsules.
Figure 1B:
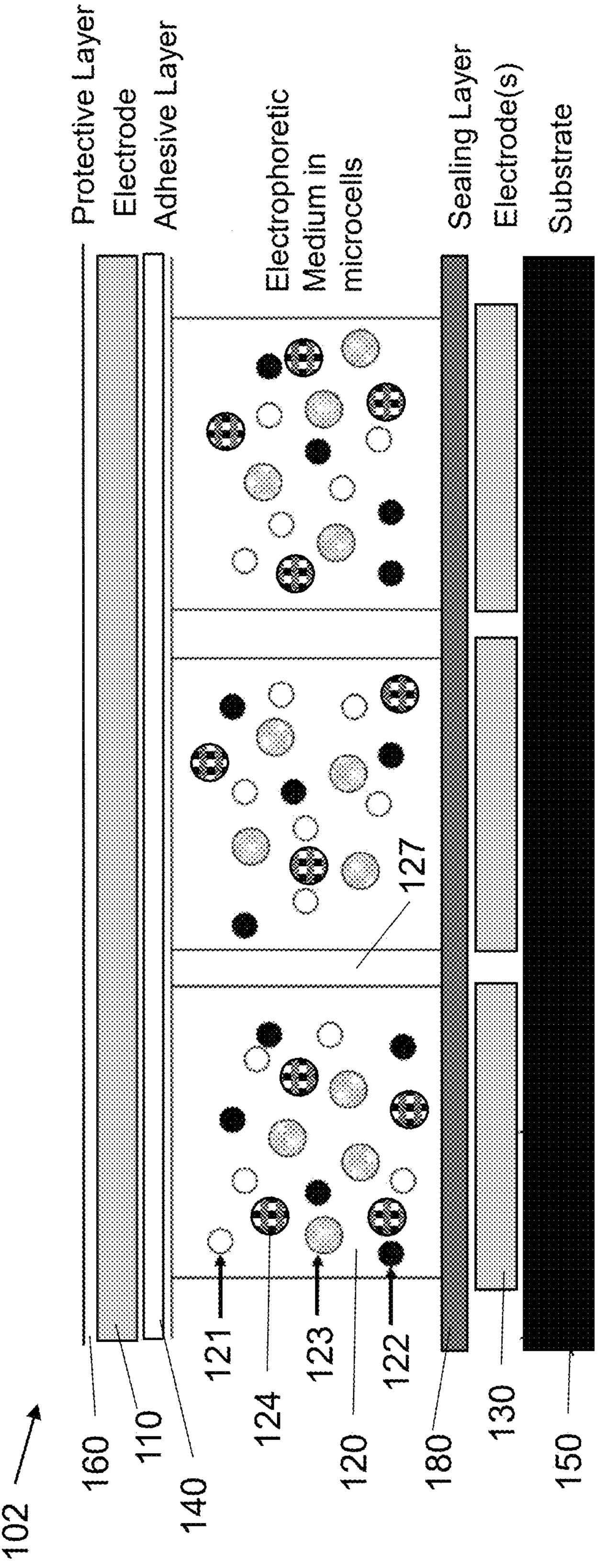
FIG. 1B is a representative cross-section of a four-particle electrophoretic display wherein the electrophoretic medium is encapsulated in microcells.
Figure 1C:
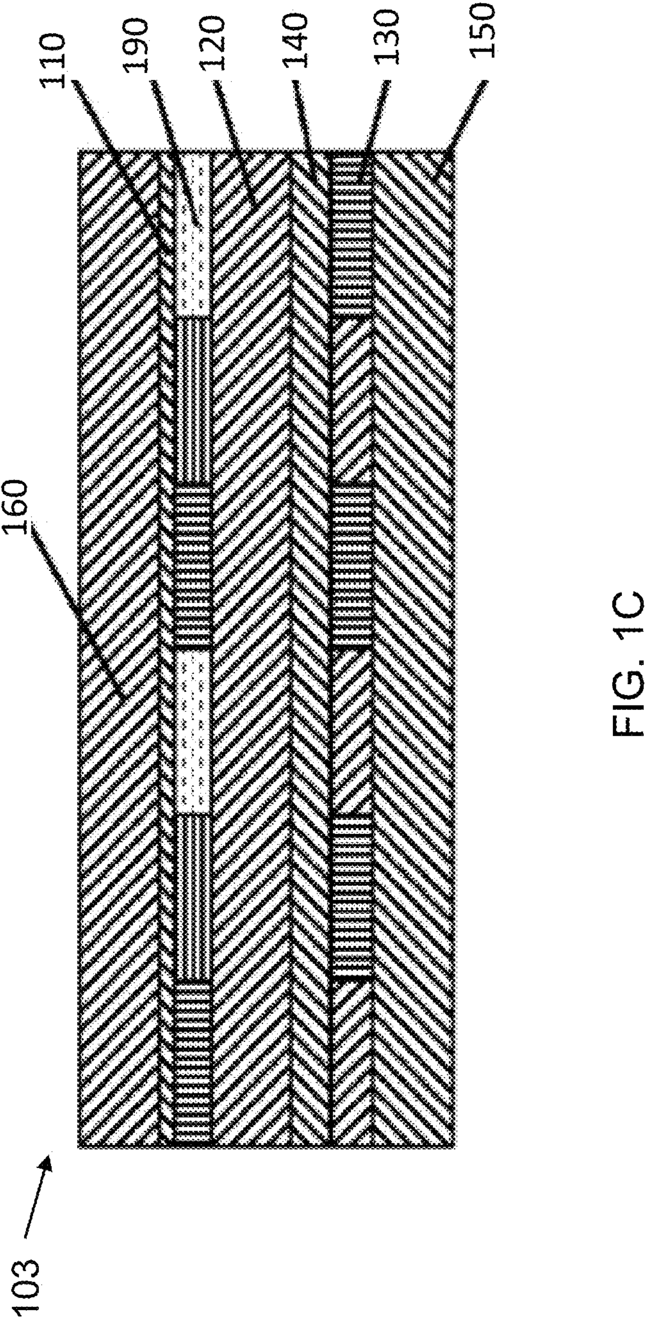
FIG. 1C is a representative cross-section of an electrophoretic display, e.g., including an electrophoretic layer of oppositely charged black and white particles, coupled to a color filter array (CFA) disposed between the electrophoretic layer and the viewer.
Figure 1E:
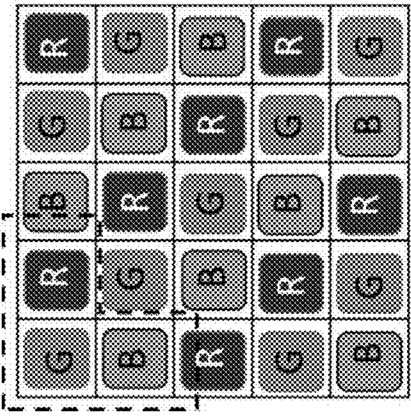
FIG. 1E is an exemplary RBG color filter array pattern that can be used with a CFA-enabled color electrophoretic display. The dashed line defines a “pixel” for the purposes of defining a pixel in an image. Each pixel of the RGB CFA includes an independently controllable red, green, and blue partially-transmissive filter portion, known as a subpixel; a portion around each subpixel is clear (a.k.a., partial fill CFA)
Figure 1D:
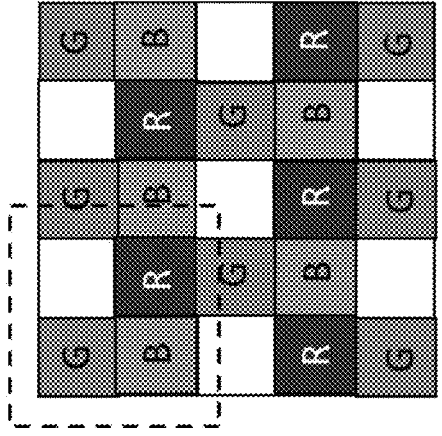
FIG. 1D is an exemplary RBGW color filter array pattern that can be used with a CFA-enabled color electrophoretic display. The dashed line defines a “pixel” for the purposes of defining a pixel in an image. Each pixel of the RGBW CFA includes an independently controllable red, green, and blue partially-transmissive filter portion, known as a “subpixel”; a clear (a.k.a. white) subpixel helps to improve white and light colors in an image. Below each subpixel is an independently-controllable pixel electrode of the type shown in FIG. 2B.

in order to improve white and light colors in an image, but with higher overall resolution that in FIG. 1D. Below each subpixel is an independently-controllable pixel electrode of the type shown in FIG. 2B.

Figure 2A:
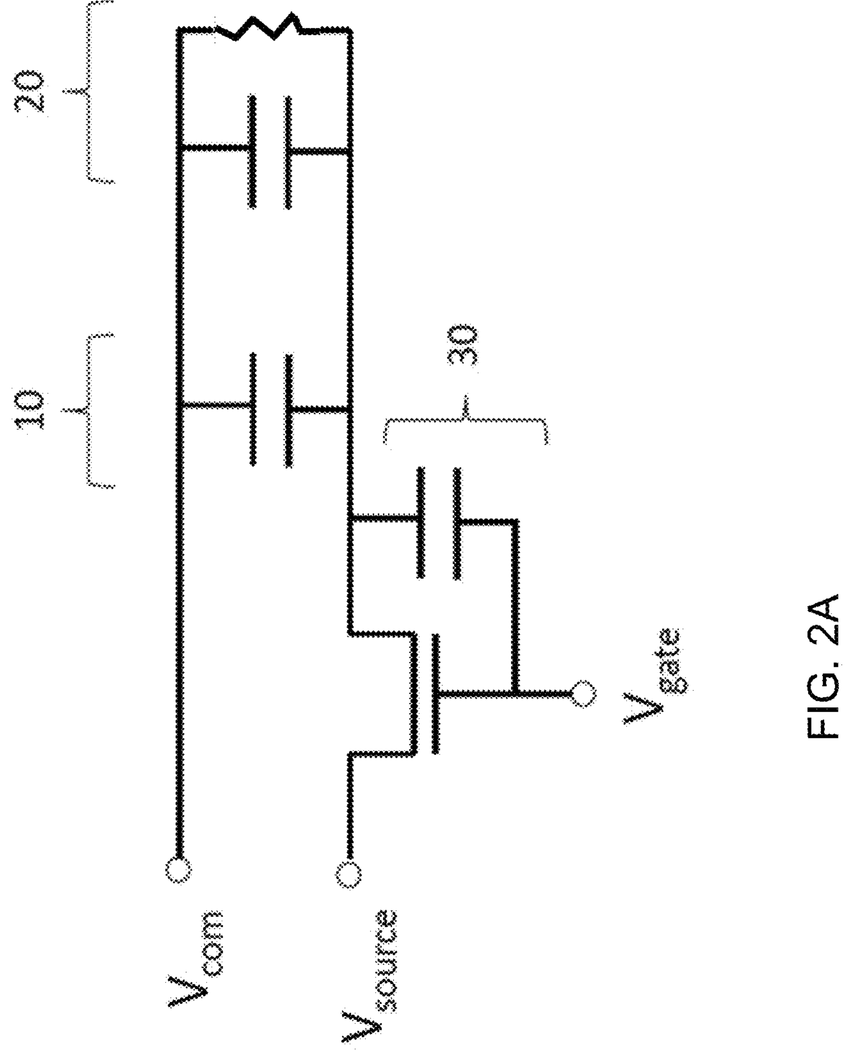

FIG. 2A illustrates an exemplary equivalent circuit of a single pixel of an electrophoretic display that uses an active matrix backplane with a storage capacitor.

Figure 2B:
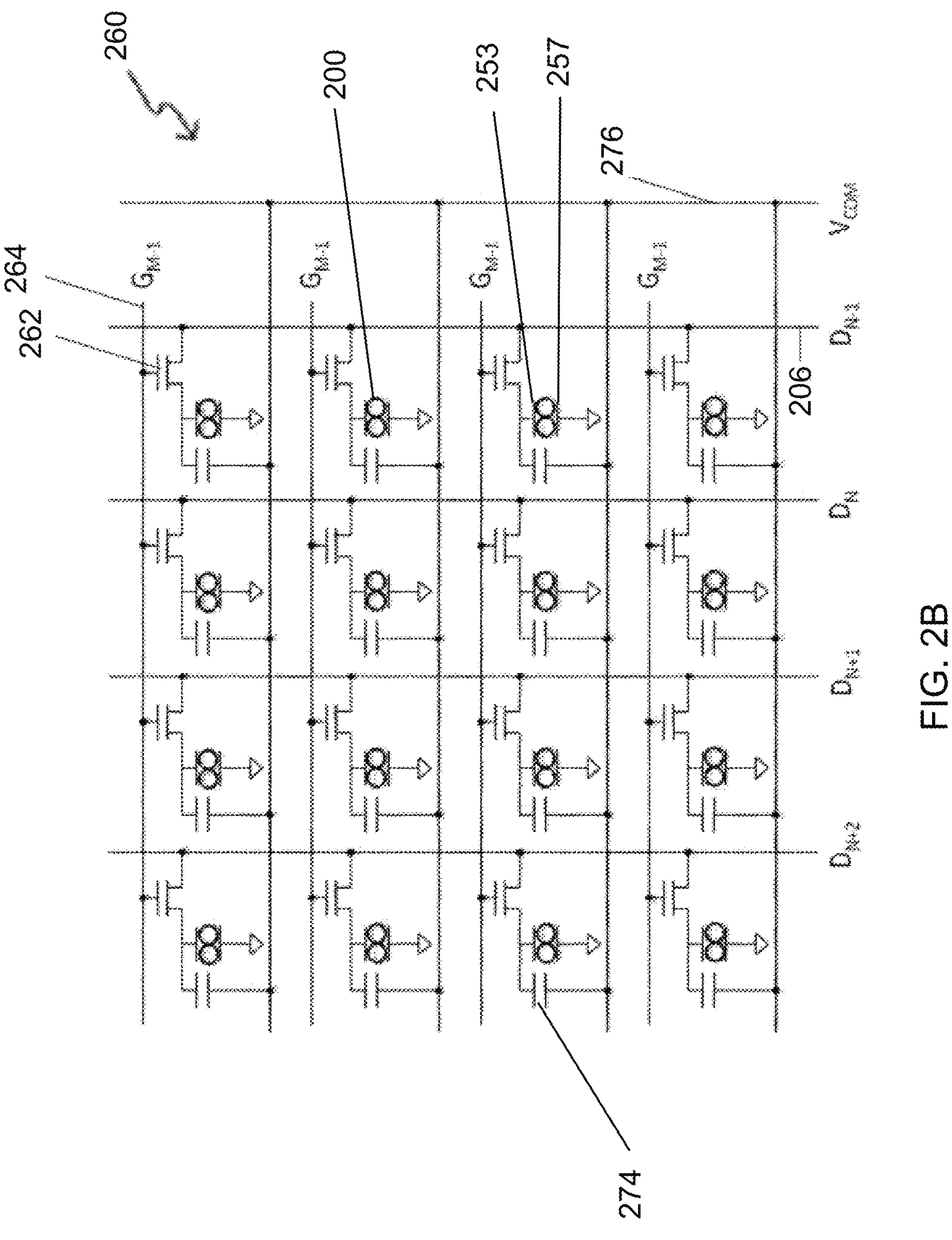

FIG. 2B illustrates an exemplary equivalent circuit of a simplified electrophoretic display of the invention, allowing driving in a row-column format.

Figure 3:
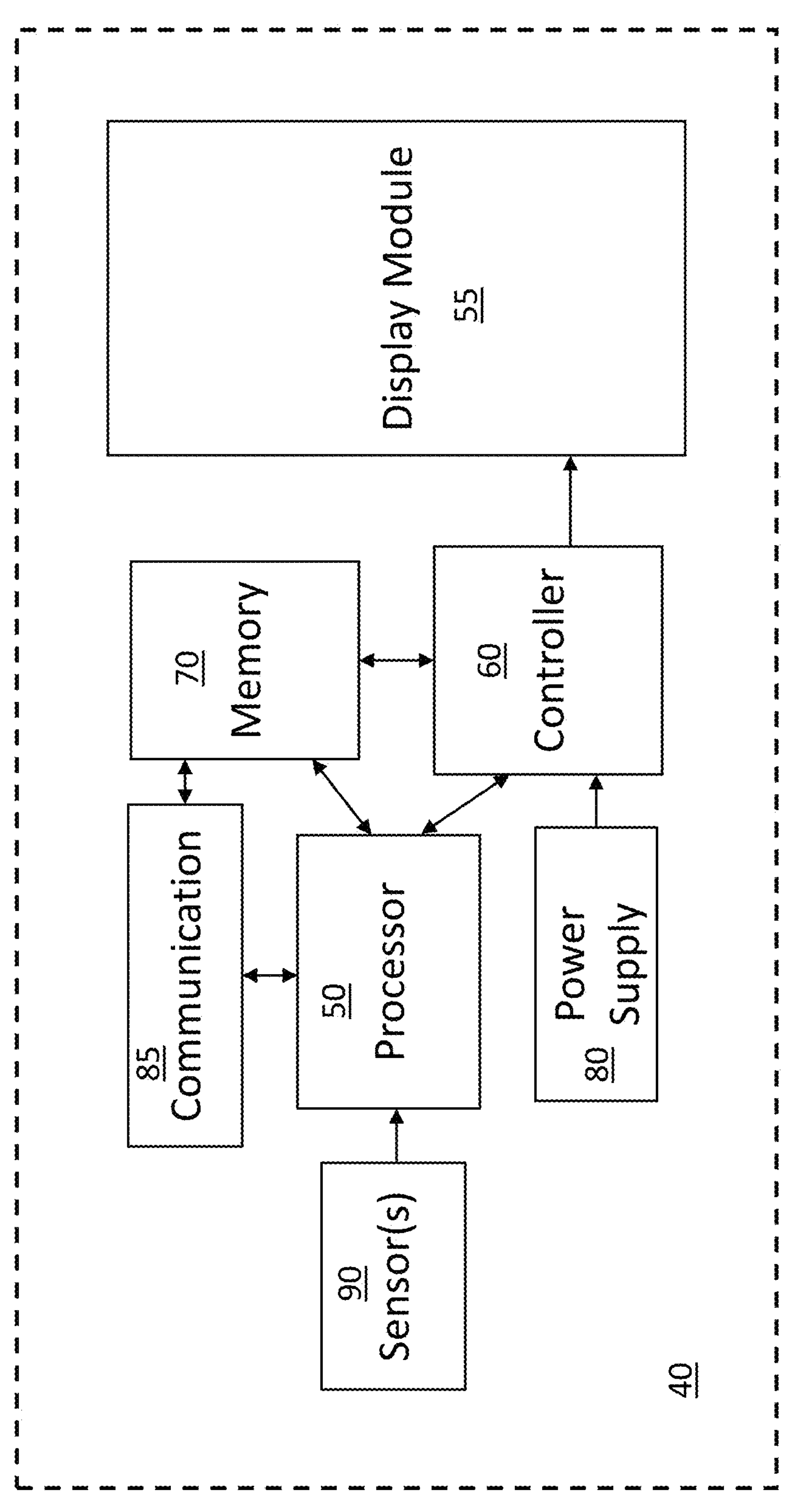

FIG. 3 illustrates an exemplary electrophoretic display that includes a display module. The electrophoretic display also includes a processor, memory, one or more power supplies, and a controller. The electrophoretic display may also include sensors to allow the electrophoretic display to adjust operational parameters based upon the ambient environment, e.g., temperature and illumination.

FIG. 4A illustrates the preferred position of each of the four sets of particles to produce eight standard colors in a white-cyan-magenta-yellow (WCMY) four-particle electrophoretic display, wherein the white particles are reflective and the cyan, magenta, and yellow particles are absorptive.

FIG. 4B illustrates the preferred position of each of the four sets of particles to produce seven standard colors in a white-red-yellow-blue semi-absorptive (WRYB*) four-particle electrophoretic display, wherein the white, red, and yellow particles are reflective and the blue particle is semi-absorptive (B*).

Figures 5, 6:
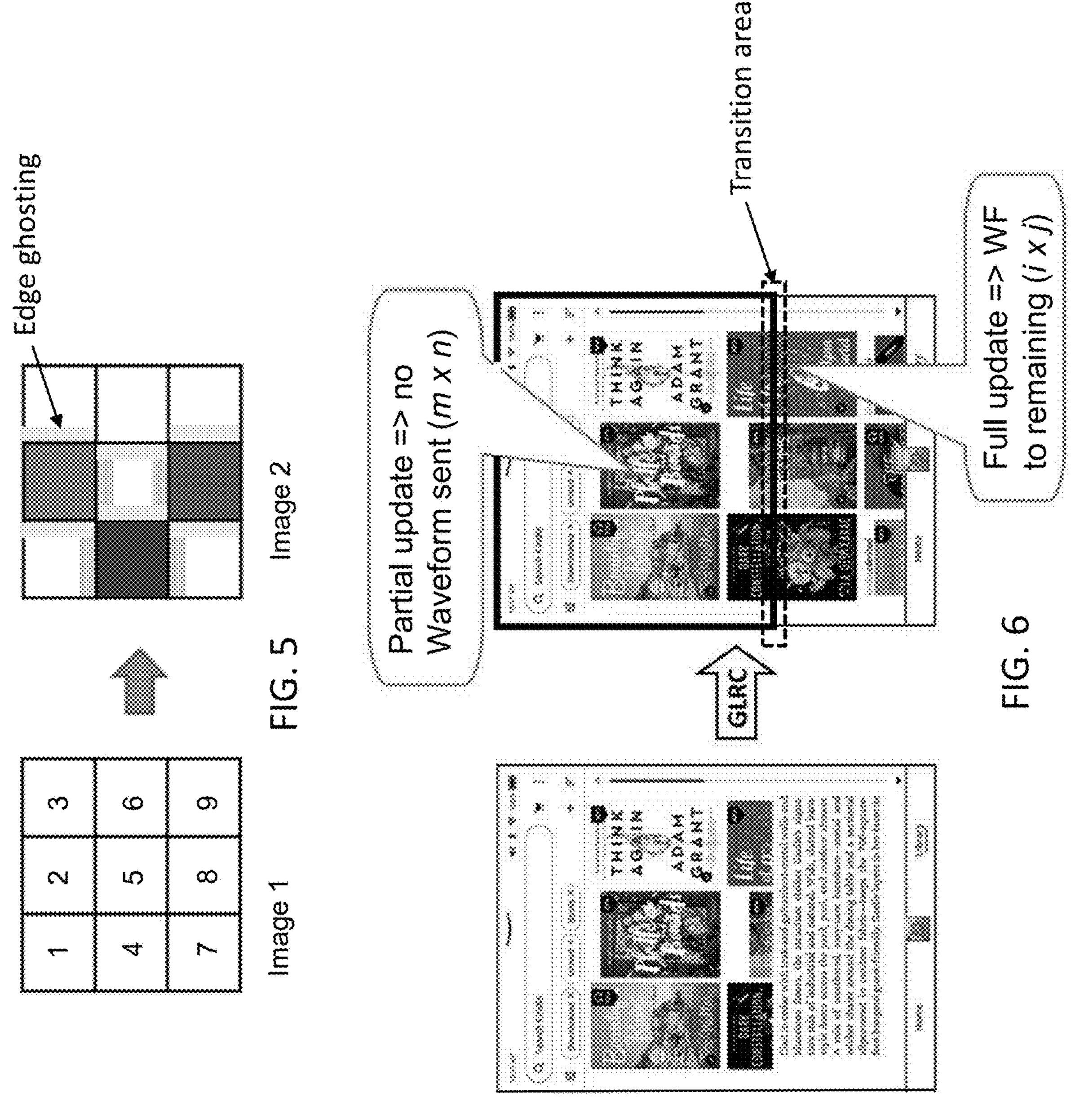

FIG. 5 illustrates the generalized issue of edge ghosting in an electrophoretic display.

FIG. 6 illustrates a simple partial update in a color electrophoretic display wherein a first portion of the display, i.e., m×n pixels, does not receive an update because the content remains the same between a first and a second image, while a second portion of the display, i.e., i×j pixels, receive a full update because the content has been updated between a first and a second image.

Figures 7, 8:
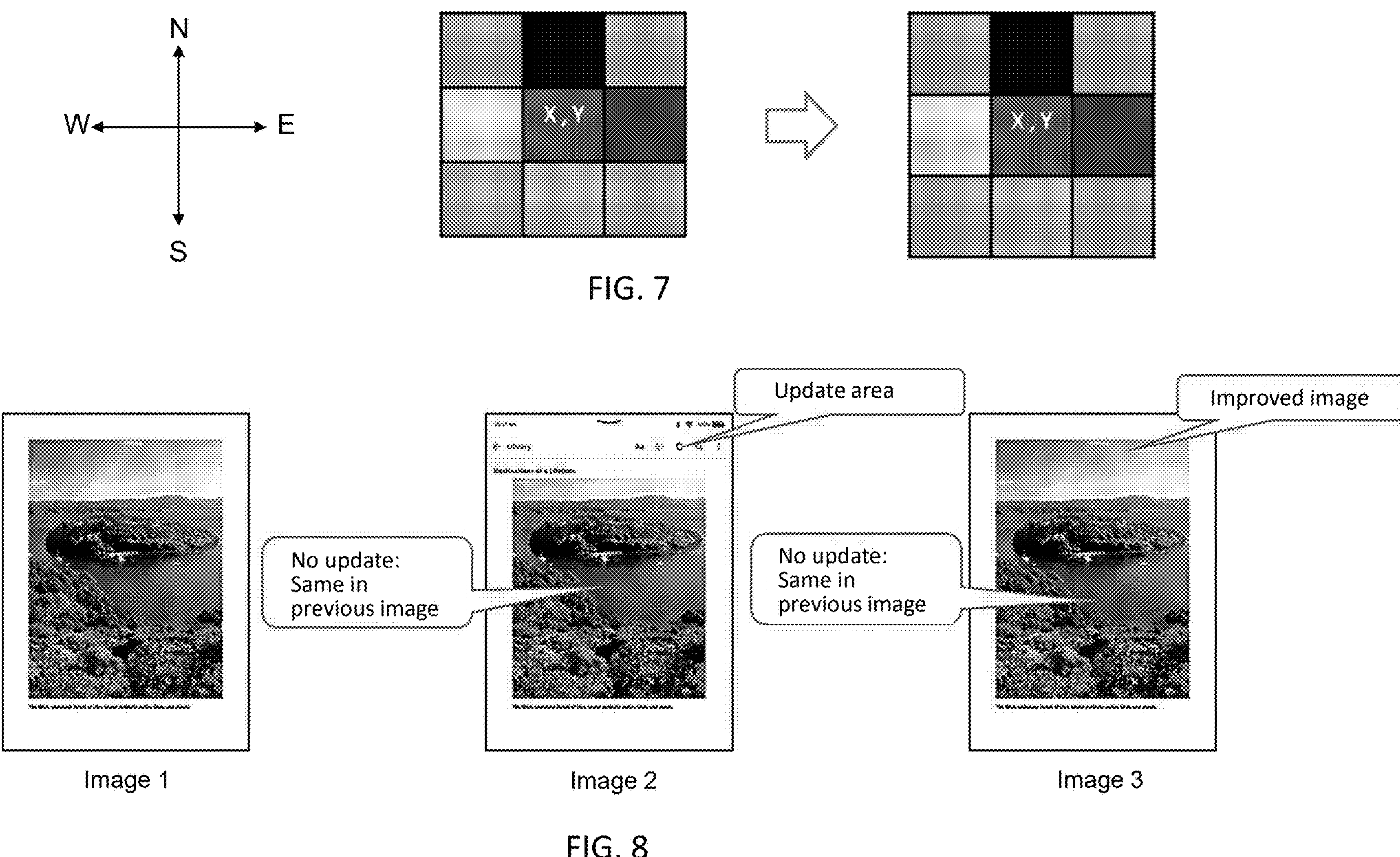

FIG. 7 illustrates the cardinal neighbor pixel electrodes of a target pixel electrode (x, y).

FIG. 8 illustrates an advanced partial update in a color electrophoretic display wherein a given pixel electrode that is not being updated may be updated depending upon the update status of the given pixel's cardinal neighbors. The overall result is a less "flashy" transition that achieves better color performance with less energy consumption.

Figure 9:
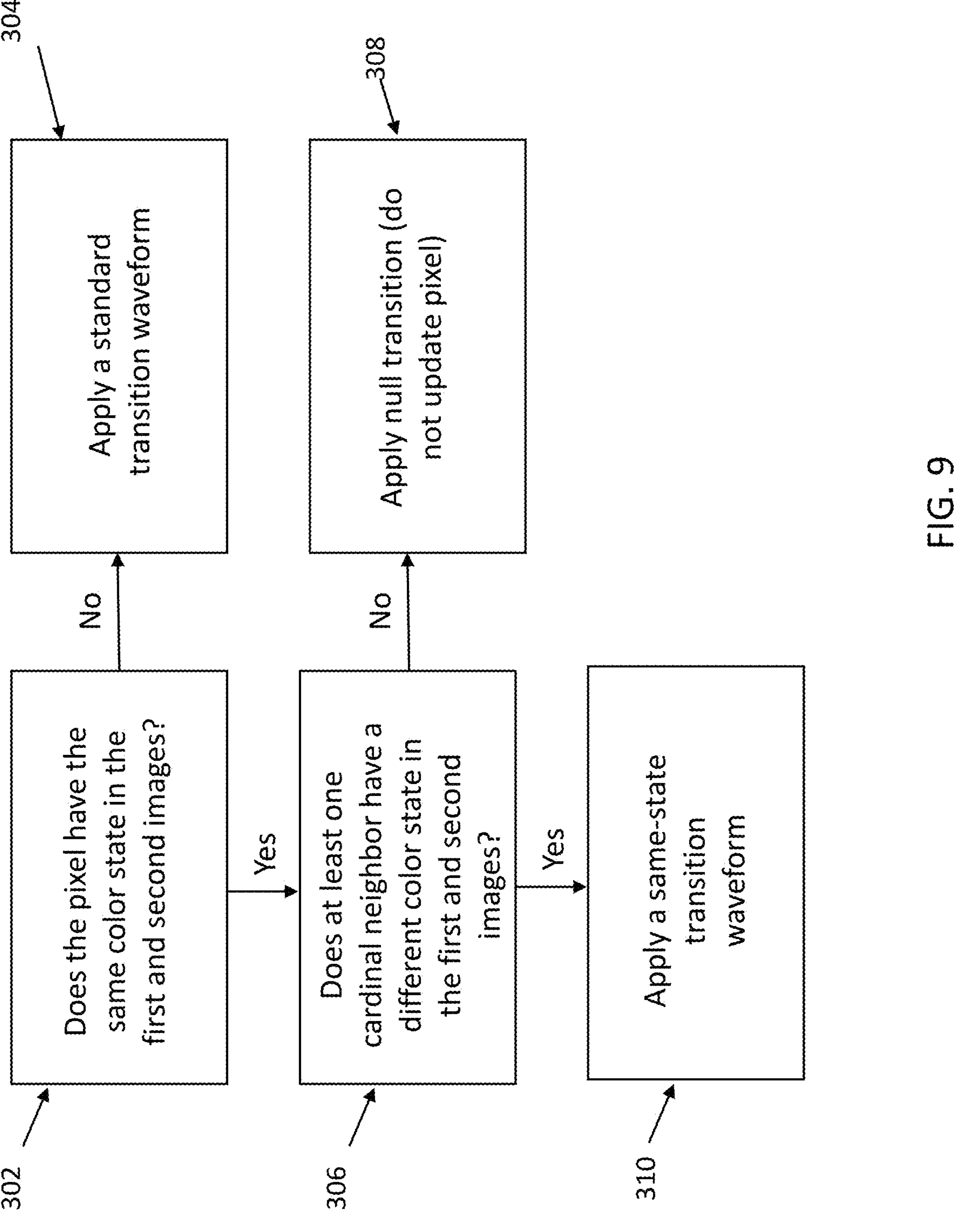

FIG. 9 is a flowchart describing a method of the invention.

DETAILED DESCRIPTION

The invention details methods for improved partial updates in color electrophoretic displays. In general, a partial update is used when only a portion of the display needs to be updated between a first and a second image because 1) only a portion of the display is being updated, i.e., because of a pull-down menu, updated text box, pop-up, etc. while the remaining image is static, or 2) some of the pixels have an identical color state between a first image and a second image. Partial update methods save energy because fewer pixel electrodes need to be switched between a first and a second image. Additionally, because fewer pixels are being updated, the transition is perceived to be less "flashy", i.e., the transition is not jarring to a viewer. However, because of inter-pixel coupling, i.e., as discussed in the Background (a.k.a. "blooming"), the borders between updated pixel electrodes and non-updated pixel electrodes during the partial update may experience unintended color state drift, which can results in the shade of a given subpixel being incorrect, the color of a given image pixel being incorrect, or the color of a dithered area of the image being incorrect. The inter-pixel coupling may also result in phantom images (a.k.a. "ghosts") being visible in an updated image. The ghosting can be especially pronounced when an area of the display is repeatedly driven, i.e., a video rate countdown clock. Using the methods of the invention, many of the color and ghosting problems can be minimized in color electrophoretic displays, regardless of the nature of the color electrophoretic display, be it multiple different-colored particles at each pixel electrode or a color filter array display including black and white particles beneath each subpixel of the display pixel.

Methods for fabricating an electrophoretic display including two, three, four (or more) particles have been discussed in the prior art. The electrophoretic fluid may be encapsulated in microcapsules or incorporated into microcell structures that are thereafter sealed with a polymeric layer. The microcapsule or microcell layers may be coated or laminated to a plastic substrate or film bearing a transparent coating of an electrically conductive material. Alternatively, the microcapsules may be coated onto a light transmissive substrate or other electrode material using spraying techniques. (See U.S. Pat. No. 9,835,925, incorporated by reference herein). The resulting assembly may be laminated to a backplane including pixel electrodes using an electrically conductive adhesive. The assembly may alternatively be attached to one or more segmented electrodes on a backplane, wherein the segmented electrodes are driven directly. In another embodiment the assembly, which may include a non-planar light transmissive electrode material is spray coated with capsules and then overcoated with a back electrode material. (See U.S. Patent Publication No. 2021/0132459, incorporated by reference herein.) Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

Electrophoretic media used herein include charged particles that vary in color, reflective or absorptive properties, charge density, and mobility in an electric field (measured as a zeta potential). A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention. For example, the electrophoretic medium might include a fluid, a plurality of first and a plurality of second particles dispersed in the fluid, the first and second particles bearing charges of opposite polarity, the first particle being a light-scattering particle and the second particle having one of the subtractive primary colors, and a plurality of third and a plurality of fourth particles dispersed in the fluid, the third and fourth particles bearing charges of opposite polarity, the third and fourth particles each having a subtractive primary color different from each other and from the second particles, wherein the electric field required to separate an aggregate formed by the third and the fourth particles is greater than that required to separate an aggregate formed from any other two types of particles.

The electrophoretic media of the present invention may contain any of the additives used in prior art electrophoretic media as described for example in the E Ink and MIT patents and applications mentioned above. Thus, for example, the electrophoretic medium of the present invention will typically comprise at least one charge control agent to control the charge on the various particles, and the fluid may have dissolved or dispersed therein a polymer having a number average molecular weight in excess of about 20,000 and being essentially non-absorbing on the particles to improves the bistability of the display, as described in the aforementioned U.S. Pat. No. 7,170,670.

In one embodiment, the present invention uses a light-scattering particle, typically white, and three substantially non-light-scattering particles. There is of course no such thing as a completely light-scattering particle or a completely non-light-scattering particle, and the minimum degree of light scattering of the light-scattering particle, and the maximum tolerable degree of light scattering tolerable in the substantially non-light-scattering particles, used in the electrophoretic of the present invention may vary somewhat depending upon factors such as the exact pigments used, their colors and the ability of the user or application to tolerate some deviation from ideal desired colors. The scattering and absorption characteristics of a pigment may be assessed by measurement of the diffuse reflectance of a sample of the pigment dispersed in an appropriate matrix or liquid against white and dark backgrounds. Results from such measurements can be interpreted according to a number of models that are well-known in the art, for example, the one-dimensional Kubelka-Munk treatment. In the present invention, it is preferred that the white pigment exhibit a diffuse reflectance at 550 nm, measured over a black background, of at least 5% when the pigment is approximately isotropically distributed at 15% by volume in a layer of thickness 1 μm comprising the pigment and a liquid of refractive index less than 1.55. The yellow, magenta and cyan pigments preferably exhibit diffuse reflectances at 650, 650 and 450 nm, respectively, measured over a black background, of less than 2.5% under the same conditions. (The wavelengths chosen above for measurement of the yellow, magenta and cyan pigments correspond to spectral regions of minimal absorption by these pigments.) Colored pigments meeting these criteria are hereinafter referred to as "non-scattering" or "substantially non-light-scattering". Specific examples of suitable particles are disclosed in U.S. Pat. No. 9,921,451, which is incorporated by reference herein.

Alternative particle sets may also be used, including four sets of reflective particles, or one absorptive particle with three or four sets of different reflective particles, i.e., such as described in U.S. Pat. Nos. 9,922,603 and 10,032,419, which are incorporated by reference herein. For example, white particles may be formed from an inorganic pigment, such as $TiO_2$, $ZrO_2$, ZnO, $Al_2O_3$, $Sb_2O_3$, $BaSO_4$, $PbSO_4$ or the like, while black particles may be formed from CI pigment black 26 or 28 or the like (e.g., manganese ferrite black spinel or copper chromite black spinel) or carbon black. The third/fourth/fifth type of particles may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

As shown in FIGS. 1A, 1B, and IC, an electrophoretic display (101, 102, 103) typically includes a top transparent electrode 110, an electrophoretic medium 120, and a bottom electrode 130, which is often a pixel electrode of an active matrix of pixels controlled with thin film transistors (TFT). However, the bottom electrode 130 can be a singular larger electrode, such as a graphite backplane, a film of PET/ITO, a metalized film, or a conductive paint. In the electrophoretic media 120 described in FIGS. 1A and 1B, there are four different types of particles, 121, 122, 123, and 124, however more particle sets can be used with the methods and displays described herein. In the CFA display 103, the electrophoretic medium 120 may include an encapsulated electrophoretic medium with only black and white oppositely-charged particles. FIG. 1D is an exemplary RBGW color filter array pattern that can be incorporated in a CFA display 103. The colored elements may be provided directly the top transparent electrode 110, which may be, for example, indium-tin-oxide (ITO). Such CFA films are available from Toppan Printing (Japan). Alternatively, the color filter elements may be applied to the electrophoretic media 120 with an ink-jet or other precision printing process. See U.S. Pat. No. 10,209,556. As shown in FIGS. 1D and 1E, the dashed line defines a "pixel" for the purposes of defining a pixel in an image. In FIG. 1D, each pixel of the RGBW CFA includes independently-controllable red, green, and blue subpixels and an equally-sized clear (a.k.a. white) subpixel to improve white and lighter colors in an image. In FIG. 1E, pixel of the RGB CFA includes independently-controllable red, green, and blue subpixel with a portion around each subpixel being clear (a.k.a., partial fill CFA) in order to improve white and light colors in an image. In practice CFA patterns of FIG. 1E are preferred over the patterns of FIG. 1D because each image pixel is slightly smaller and thus a higher resolution can be achieved for the same number of pixel electrodes per inch (PPI), typically between 100 and 400 PPI, more commonly between 150 and 300 PPI.

In FIGS. 1A and 1B and similar embodiments, two of the four different types of particle sets, 121, 122, 123, and 124 are of first polarity, while the other two sets are of a second (opposite) polarity. In some embodiments, one of the four different types of particle sets, 121, 122, 123, and 124 is of first polarity, while the other three sets are of a second (opposite) polarity. In some embodiments two of the four different types of particle sets are of a first polarity, while the other two sets are of an opposite polarity. The electrophoretic medium 120 is typically compartmentalized such by a microcapsule 126 or the walls of a microcell 127. An optional adhesive layer 140 can be disposed adjacent any of the layers, however, it is typically adjacent an electrode layer (110 or 130). There may be more than one adhesive layer 140 in a given electrophoretic display (105, 106), however only one layer is more common. The entire display stack is typically disposed on a substrate 150, which may be rigid or flexible. The display (101, 102) typically also includes a protective layer 160, which may simply protect the top electrode 110 from damage, or it may envelop the entire display (101, 102) to prevent ingress of water, etc. Electrophoretic displays (101, 102) may also include sealing layers 180 as needed. In some embodiments the adhesive layer 140 may include a primer component to improve adhesion to the electrode layer 110, or a separate primer layer (not shown in FIG. 1B) may be used. The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.

In some embodiments, e.g., as shown in FIG. 1A, the electrophoretic display may include only a first light-transmissive electrode, an electrophoretic medium, and a second (rear) electrode, which may also be light-transmissive. However to produce a high-resolution display, e.g. e.g., as shown in FIG. 1B. Of course, each pixel must be addressable without interference from adjacent pixels so that an image file is faithfully reproduced in the display. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.)

After a pre-selected interval known as the "line address time" the selected row is deselected, the next row is selected, and the voltages on the column drivers are changed so that the next line of the display is written. This process is repeated so that the entire display is written in a row-by-row manner. The entire process is coordinated with a clock circuit. The time between addressing a pixel for the nth time and the following addressing, n+1, is known as a "frame." Thus, a display that is updated at 60 Hz has frames that are 16 msec. "Frames" are not limited to use with an active matrix backplane, however. The driving frames described herein can also be used to refer to a unit of time between updates of, e.g., a singular backplane. While it is possible to drive electrophoretic media with an analog voltage signal, such as produced by a power supply and a potentiometer, the use of a digital controller discretizes the waveform into blocks that are typically on the order of 10 ms, however shorter or longer framewidths are possible. For example, a frame can be 0.5 ms, or greater, such as 1 ms, 5 ms, 10 ms, 15 ms, 20 ms, 30 ms, or 50 ms. In most instances a frame is less than 100 ms, such 250 ms, 200 ms, 150 ms, or 100 ms. In most applications described herein, the frame is between 5 ms and 30 ms in width, for example 8 ms in width. Specialized drive controllers for electrophoretic displays are available from, e.g., Ultrachip and Rockchip, however programmable voltage drivers can also be used, such as available from Digi-Key and other electronics components suppliers.

In a conventional electrophoretic display using an active matrix backplane, each pixel electrode has associated therewith a capacitor electrode (storage capacitor) such that the pixel electrode and the capacitor electrode form a capacitor; see, for example, International Patent Publication WO 01/07961. In some embodiments, N-type semiconductor (e.g., amorphous silicon) may be used to from the transistors and the "select" and "non-select" voltages applied to the gate electrodes can be positive and negative, respectively.

FIG. 2A of the accompanying drawings depicts an exemplary equivalent circuit of a single pixel of an electrophoretic display. As illustrated, the circuit includes a capacitor 10 formed between a pixel electrode and a capacitor electrode. The electrophoretic medium 20 is represented as a capacitor and a resistor in parallel. In some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. [In some embodiments, to compensate for the unwanted "kickback voltage", a common potential $V_{com}$, may be supplied to the top plane electrode and the capacitor electrode associated with each pixel, such that, when $V_{com}$ is set to a value equal to the kickback voltage ($V_{KB}$), every voltage supplied to the display may be offset by the same amount, and no net DC-imbalance experienced.]

In many embodiments, the TFT array forms an active matrix 260 for image driving, as shown in FIG. 2B. For example, each pixel electrode 253 (corresponding to 130 in FIGS. 1A and 1B) is coupled to a thin-film transistor 262 patterned into an array, and connected to gate (row) driver lines 264 and source (column) driver lines 206, running at right angles to the gate drive lines 264. Also, typically, the common (top) light-transparent electrode 257 (corresponding to 110 in FIGS. 1A and 1B) has the form of a single continuous electrode while the other electrode or electrode layer is patterned into a matrix of pixel electrodes 253, each of which defines one pixel of the display. Between the pixel electrode 253 and the common electrode 257, an electrophoretic medium 200 can be disposed. Any of the electrophoretic media described above may be used, and while FIG. 2B depicts the electrophoretic medium as contained in microcapsules, microcells, as shown in FIG. 1B, as also suitable. A source driver (not shown) is connected to the source driver lines 206 and provides source voltage to all TFTs 262 in a column that are to be addressed. A gate driver (not shown) is connected to the gate driver lines 264 to provide a bias voltage that will open (or close) the gates of each TFT 262 along the row. The gate scanning rate is typically ~60-150 Hz. When the TFTs 262 are n-type, taking the gate-source voltage positive allows the source voltage to be shorted to the drain. Taking the gate negative with respect to the source causes the drain source current to drop and the drain effectively floats. Because the scan driver acts in a sequential fashion, there is typically some measurable delay in update time between the top and bottom row electrodes. It is understood that the assignment of "row" and "column" electrodes is somewhat arbitrary and that a TFT array could be fabricated with the roles of the row and column electrodes interchanged. Each pixel of the active matrix 260 also includes a storage capacitor 274 as discussed above with respect to FIG. 2A. The storage capacitors 274 are typically coupled to $V_{com}$ line 276. In some embodiments the common light-transparent electrode 257 is coupled to ground, as shown in FIG. 2B. In other embodiments, the common light-transparent electrode 257 is also coupled to $V_{com}$ line 276 (not shown in FIG. 2B).

The active matrix 260 described with respect to FIG. 2B (i.e., including the electrophoretic medium 200 and the common light-transparent electrode 257) is typically covered by a protective sheet (e.g., integrated barrier) and sealed to create a display module 55, as shown in FIG. 3. Such a display module 55 becomes the focus of an electrophoretic display 40. The electrophoretic display 40 will typically include a processor 50, which is configured to coordinate the many functions relating to displaying content on the display module 55, and to transform "standard" images, such as sRGB images to a color regime that best duplicates the image on the display module 55. In some embodiments, the processor 50 performs the methods of the invention by determining which pixel electrodes should be updated during a partial update. Especially when dithering is being used for color production, the processor 50 can determine which areas of the dithered color are most at risk from blooming due to nearby pixel electrode updates. In other embodiments, some or all of the steps of the invention may be completed by the controller 60. As controller 60 architecture advances, more of the image processing can be embedded into the controller 60 such that an advanced controller can be incorporated into the same package as the display module 55 and pre-programmed with the tools needed to identify pixel electrodes that are at risk of blooming during a partial update. Advanced controllers for electrophoretic displays are available from ULTRACHIP and NEXTRONIX.

The processor 50 is typically a mobile processor chip, such as made by Freescale or Qualcomm, although other manufacturers are known. The processor 50 is in frequent communication with the non-transitory memory 70, from which it pulls image files and/or look up tables to perform the color image transformations described below. The non-transitory memory 70 may also include gate driving instructions to the extent that a particular color transition may require a different gate driving pattern. The electrophoretic display 40 may have more than one non-transitory memory chip. The non-transitory memory 70 may be flash memory. Once the desired image has been converted for display on the display module 55, the specific image instructions are sent to a controller 60, which facilitates voltage sequences being sent to the respective thin film transistors (described above). Such voltages typically originate from one or more power supplies 80, which may include, e.g., a power management integrated chip (PMIC). The electrophoretic display 40 may additionally include communication 85, which may be, for example, WIFI protocols or BLUETOOTH, and allows the electrophoretic display 40 to receive images and instructions, which also may be stored in memory 70. The electrophoretic display 40 may additionally include one or more sensors 90, which may include a temperature sensor and/or a photo sensor, and such information can be fed to the processor 50 to allow the processor to select an optimum look-up-table when such look-up-tables are indexed for ambient temperature or incident illumination intensity or spectrum. In some instances, multiple components of the electrophoretic display 40 can be embedded in a singular integrated circuit. For example, a specialized integrated circuit may fulfill the functions of processor 50 and controller 60.

As discussed above, a color electrophoretic display may include a color filter array or an expanded particle system capable of producing all colors above each pixel electrode. As shown in FIG. 4A, in the instance of a four-particle system including subtractive cyan, yellow, and magenta particles paired with a reflective white particle, each of the eight principal colors (red, green, blue, cyan magenta, yellow, black and white) corresponds to a different arrangement of the four pigments. The three particles providing the three subtractive primary colors, e.g., for an Advanced Color electronic Paper (ACeP) display, may be substantially non-light-scattering ("SNLS"). The use of SNLS particles allows mixing of colors and provides for more color outcomes than can be achieved with the same number of scattering particles. These thresholds must be sufficiently separated relative to the voltage driving levels for avoidance of cross-talk between particles, and this separation necessitates the use of high addressing voltages for some colors. In addition, addressing the colored particle with the highest threshold also moves all the other colored particles, and these other particles must subsequently be switched to their desired positions at lower voltages.

The system of FIG. 4A, in principle, works similar to printing on bright white paper in that the viewer only sees those colored pigments that are on the viewing side of the white pigment (i.e., the only pigment that scatters light). In FIG. 4A, it is assumed that the viewing surface of the display is at the top (as illustrated), i.e., a user views the display from this direction, and light is incident from this direction. As already noted, in preferred embodiments only one of the four particles used in the electrophoretic medium of the present invention substantially scatters light, and in FIG. 4A this particle is assumed to be the white pigment. This light-scattering white particle forms a white reflector against which any particles above the white particles (as illustrated in FIG. 4A) are viewed. Light entering the viewing surface of the display passes through these particles, is reflected from the white particles, passes back through these particles and emerges from the display. Thus, the particles above the white particles may absorb various colors and the color appearing to the user is that resulting from the combination of particles above the white particles. Any particles disposed below (behind from the user's point of view) the white particles are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 4A), there are no particles above the white particles and the pixel simply displays a white color. When a single particle is above the white particles, the color of that single particle is displayed, yellow, magenta and cyan in Situations [B], [D] and [F] respectively in FIG. 4A. When two particles lie above the white particles, the color displayed is a combination of those of these two particles; in FIG. 4A, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 4A), all the incoming light is absorbed by the three subtractive primary colored particles and the pixel displays a black color. Because the order of the particles between the pixel electrode and viewer is critical, a pixel electrode that is not updated during a partial update can be disturbed by a neighboring pixel that is being updated. Furthermore, the resulting color shift may not be predictable because the highest charged particles, typically cyan, move the most due to inter-pixel coupling.

An alternative particle set using reflective color particles is shown in FIG. 4B. In the embodiment of FIG. 4B, the reflective particles are white, red, and yellow, and they are combined with a semi-transparent blue, however alternative color sets could be used provided that the combination of colors suitably spanned the useful color spectrum. In the system of FIG. 4B, for white, red, and yellow, the color viewed at the surface is due to direct reflection of the colored particles, for orange it is a mixture of red and yellow reflective pigments. For green, blue, and black at the viewing surface, the colors at the viewing surface are due to mixtures of the semi-transparent blue particle with reflective yellow, white, and red particles, respectively. Because a viewer is looking at light that is predominantly only interacting with one pigment surface, images produced with a system of FIG. 4B appear more saturated than the colors of FIG. 4A. However the overall gamut of colors using a system of FIG. 4B is diminished as compared to those of FIG. 4A because it is difficult to achieve fine control of the amount of specific particles that are mixed together to create secondary colors (e.g., orange, green, violet). In applications such as digital signage, the saturation is often more important than the color gamut, and many users are satisfied with a set of seven or eight "standard" colors. It should also be realized with respect to FIG. 4B, that the reflective red and semi-transparent blue particles can switch roles, i.e., to make an electrophoretic display medium including reflective white, yellow, and blue particles and a semi-transparent red particle. Such a system yields a set of primary colors similar to FIG. 4B, but wherein red at the viewing surface results from a combination of semi-transparent red and white. Because the system of FIG. 4B includes mostly reflective particles, electrophoretic displays including this medium are less influenced by inter-pixel coupling. However, the methods of the invention can still be used with these systems.

Different combinations of light scattering and light absorbing particle sets are also possible. For example, one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black). Of course, it would not be easy to render the color black if more than one type of colored particle scattered light without the presence of an absorptive black particle.

FIGS. 4A and 4B show idealized situations in which the colors are uncontaminated (i.e., the light-scattering white particles completely mask any particles lying behind the white particles in FIG. 4A, or the selected reflective particles shield all of the other particles that should not be visible in FIG. 4B). In practice, the masking by the white particles may be imperfect so that there may be some small absorption of light by a particle that ideally would be completely masked. Such contamination typically reduces both the lightness and the chroma of the color being rendered. In the instance of FIG. 4B, the presence of the light-absorbing particles often causes the overall image to look darker due to imperfect scattering of the reflective particles. This is particularly problematic for green hues because the human eye is very sensitive to different shades of green, whereas different shades of red are not as noticeable. In some embodiments, this can be corrected with the inclusion of additional particles with different steric or charge characteristics, e.g., a green scattering particle, however adding additional particles complicates the drive scheme and may require a wider range of driving voltages. Obviously, in the electrophoretic media described herein, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above.

Waveforms for driving four-particle electrophoretic media have been described previously. Waveforms for driving color electrophoretic displays having four particles are described in U.S. Pat. Nos. 9,921,451, 9,812,073, and 11,640,803, all of which are incorporated by reference herein. Most commercial electrophoretic displays use amorphous silicon based thin-film transistors (TFTs) in the construction of active matrix backplanes (260) because of the wider availability of fabrication facilities and the costs of the various starting materials. Amorphous silicon thin-film transistors may become unstable when supplied gate voltages that would allow switching of voltages higher than about +/−15V. Accordingly, as described in previous patents/applications on such systems, improved performance is achieved by additionally changing the bias of the top light-transmissive electrode with respect to the bias on the backplane pixel electrodes, a technique known as top-plane switching. Thus, if a voltage of +30V (relative to the backplane) is needed, the top plane may be switched to −15V while the appropriate backplane pixel is switched to +15V. Methods for driving a four-particle electrophoretic system with top-plane switching are described in greater detail in, for example, U.S. Pat. No. 9,921,451. In alternative embodiments, metal oxide semiconductors may be incorporated into thin film transistors for active matrix backplanes (260), including IGZO, i.e., as described in U.S. Pat. No. 11,776,496, which is incorporated by reference in its entirety.

As discussed previously, partial updates for image transitions are useful to reduce transition flashiness especially for instances where much of a second image is identical to a first image. This includes instances where only part of the screen is changing, like drop-down menu where it is better to not update the unaffected portions of the screen in order to avoid a distracting flash. However, as illustrated in FIG. 5, interpixel coupling can cause portions of the electrophoretic medium above a non-switching pixel electrode to experience an electric field resulting in some of the particles being displaced from their desired position. For example, in FIG. 5, pixels 1, 3, 5, 6, 7, and 9 are intended to maintain a white state in the first and the second images, while pixels 2 and 8 are to transition from a white state to a (non-black) graytone, and pixel 4 is to transition from a white state to a black state. As a result of inter-pixel coupling, for pixels 1, 3, 5, 6, 7, and 9 the portion of the electrophoretic medium that is adjacent the pixel electrodes that are being updated is unintentionally re-colored. This phenomenon is known as edge ghosting, or differential blooming ghosting, and in aggregate can lead to "leftover" images after an image update. In addition to showing shapes, the edge ghosting can influence the color that is perceived when one of the non-updating pixel electrodes is a sub-pixel of a CFA image pixel or when the electrophoretic medium is color sensitive to ghosting (as described above with respect to subtractive particle systems. Edge ghosting can also lead to color shifts when dithering is used to create colors that are not in the primary color palette produced by the electrophoretic particle system.

A simple solution to partial updates in a color electrophoretic display is to create a bounding box that is slightly smaller than the area of the display that is undergoing a transition and then send a null update to all of the pixels in this bounding box, as shown in FIG. 6. With this method the edges of the non-updated area of the display are forced to update to the same image which clears most of the edge ghosting that is caused by the actual updated content changing color state. As shown in FIG. 6, a text box is being removed between the first and second images to give the complete library menu. The non-updated area of the display (m×n) would normally not be updated, but a bounding box (green box) is created, which is slightly smaller than the (m×n) area that should not be updated using a partial update method. This smaller than needed bounding box creates a transition zone (red box) wherein the bottom of the transition zone, corresponding to the upper edge of the update portion (i×j), will have the same colors in the first and second image because all of the pixels in the lower portion of the transition actively update to the same state. Meanwhile, the top portion of the transition zone (red box) will receive a null update, but most of the colors in the adjacent pixels along the horizontal boundary between the top and bottom rows of the transition zone are roughly the same, thus the interpixel coupling will result in a less pronounced color shift for the non-updated region. In some embodiments, the transition zone (red box) is only two pixel electrode rows in height or only two pixel electrode columns in width. More typically, especially with CFA devices, the transition zone (red box) is four pixel electrode rows in height or four pixel electrode columns in width to account for the subpixels of a pixel image. Accordingly, the bounding box would be at least two pixel electrode rows smaller than it should be or at least two pixel electrode columns smaller than it should be (or both).

A more elegant solution, which results in better-looking transitions and overall better color quality is illustrated in FIGS. 7 and 8. Each pixel (x, y) that does not undergo a color change between first and second images, and is a candidate for a null transition, also has its cardinal neighbors evaluated, as shown in FIG. 7. Similar to the cardinal axis of compass (north, south, east, west) a no-update pixel has pixels to the immediate top, bottom, left, and right, and if those pixels are undergoing a transition between the first and second images, those cardinal neighbor transitions are more likely to result in edge ghosting (see FIG. 5). In the event that one or more of the cardinal neighbor pixels is undergoing a transition, the controller will receive instructions to update pixel (x, y) to insure that there is no color drift due to edge ghosting. It is somewhat arbitrary how many cardinal neighbors need to be changing color state between first and second images in order to send same-update instructions to pixel (x, y). In some instances, such as video rate transitions, an extra self-update for pixel (x, y) may not be worthwhile because the difference will not be noticeable to the viewer. On the other hand, for high resolution images or images for which color match is critical, the secondary cardinal pixels to pixel (x, y), i.e., northeast, southeast, southwest, and northwest can be evaluated for color changes and the potential influence on the color state of pixel (x, y) in a second image. The pseudo code to achieve such an update is shown below:

```
If PU_enable is true
    If currState(i,j)==nextState(i,j), AND for all 8 neighbors (*) currState=nextState Then Apply
    E_Transition (empty: partial update)
Wherein an empty transition means that no update instructions are sent to the pixel (i,j) and it maintains its previous color state.
```

The above method is also useful for avoiding color shifts when transitioning between two images that have similar pixel color compositions but different presentations, such as shown in FIG. 8. In FIG. 8, an eReader has a small pull-down menu that blocks a portion of an image of a lake and sky. The color content of the update area is actually quite similar between images 1 and 3 and image 2. Producing the light blue of the sky requires a large number of white pixels. The pull-down menu has a white background, so for a true partial update where only pixels undergoing color change are updated, many of the white pixels would receive a null transition between images 1, 2, and 3. However, the interspersed blue pixels and the white to black to white transition for the text of the pull-down menu would normally result in ghosting of the pull-down text in image 3. Furthermore, because the sky is slightly dithered in the rendered image, the sky is actually a slightly different color between images 1 and 3. Using the method of the invention, only same pixel color transitions between images 2 and 3 that have no cardinal neighbors undergoing a color transition will receive null (empty) update instructions. All of the other pixels with same pixel color transitions, but with neighbors undergoing transitions will receive instructions to update to the same color by driving the pixel again to the desired color state. While this method results in more pixels being updated than if no analysis was done, the end result is less ghosting and better color rendering. Nonetheless, this method is less energy-intensive that the method shown in FIG. 6 because many of the pixels that are presenting the same color in images 2 and 3 are not updated.

A flowchart describing the method is shown in FIG. 9. At step 302 pixels having the same color state in the first and second images are identified. Those pixels that are not the same between the first and second images are updated as normal (step 304). Next, in step 306, the pixels that are not changing color between images are evaluated for nearest neighbors that have different colors between the first and second images. If the pixel not changing color has cardinal neighbors changing color, that pixel receives an active same-state transition waveform in step 310. The same-state transition waveform may be a full transition to a neutral state and back to the image color, or a series of smaller pulses designed to simply "top-off" the color. (Top-off pulses are typically used for same state transitions that are white-to-white or black-to-black). In step 308, pixels for which all cardinal neighbors also maintain the same color between the first and second images receive null transition instructions, that is, no energy is provided to the pixel electrode(s) corresponding to that image pixel.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A method for updating a color electrophoretic display having a controller, the display having a plurality of display pixels and being capable of displaying at least black, white, red, and yellow, the method comprising:

comparing color data for the plurality of display pixels for a first image to color data for the plurality of display pixels in a second image;

determining an m×n array of display pixels for which all of the display pixels have the same color data for both the first image and the second image;

determining an i×j array of display pixels for which some of the display pixels have different color data between the first image and the second image, wherein a combination of the m×n array of display pixels and the i×j array of display pixels accounts for all of the display pixels in the plurality of display pixels;

sending instructions to the controller to provide no update to a pixel area slightly smaller than the m×n array of display pixels when transitioning from the first image to the second image; and sending instructions to the controller to provide waveforms corresponding to the color data of the second image to all of the remaining display pixels that did not receive no update instructions, wherein some of the pixels receiving waveforms corresponding to the color data for the second image are within the m×n array of display pixels.

2. The method of claim 1, wherein the no update pixel area is at least two pixel row heights smaller than the m×n array of display pixels or at least two pixel column widths smaller than the m×n array of display pixels.

3. The method of claim 1, wherein the electrophoretic display comprises an electrophoretic medium including electrically charged particles dispersed in a fluid and confined within a plurality of capsules or microcells.

4. The method of claim 3, wherein the electrophoretic medium includes four different types of electrically charged particles, and at least two of the types of electrically charged particles have opposite polarities.

5. The method of claim 4, wherein six primary colors can be formed at each pixel electrode of the electrophoretic display.

6. The method of claim 1, wherein the electrophoretic display includes a color filter array.

7. The method of claim 6, wherein the color filter array comprises a plurality of differently colored filters and individual differently colored filters are indexed to pixel electrodes of the electrophoretic display.

8. The method of claim 7, wherein each display pixel in the plurality of display pixels corresponds to a plurality of differently colored filters indexed to a respective plurality of pixel electrodes.

9. The method of claim 1, wherein the color data is RGB color data.

10. The method of claim 1, wherein the color data has been transformed from RGB to color data specific to the electrophoretic display.

11. The method of claim 1, wherein the color data represents a color image that incorporated dithering.

* * * * *